(12) United States Patent
Kennedy (10) Patent No.: US 7,207,079 B2
(45) Date of Patent: Apr. 24, 2007

(54) BRIDGE DECK PANELS, FABRICATION METHODS AND USE

(75) Inventor: Stephen John Kennedy, Ontario (CA)

(73) Assignee: Intelligent Engineering (Bahamas) Limited, Nassau (BS)

( * ) Notice: Subject to any disclaimer, the term of this patent is extended or adjusted under 35 U.S.C. 154(b) by 639 days.

(21) Appl. No.: 10/398,587

(22) PCT Filed: Aug. 31, 2001

(86) PCT No.: PCT/GB01/03933

§ 371 (c)(1),
(2), (4) Date: Oct. 7, 2003

(87) PCT Pub. No.: WO02/29160

PCT Pub. Date: Apr. 11, 2002

(65) Prior Publication Data

US 2004/0055249 A1 Mar. 25, 2004

(30) Foreign Application Priority Data

Oct. 3, 2000 (GB) .................. 0024183.6

(51) Int. Cl.
*E01D 19/12* (2006.01)
(52) U.S. Cl. .............................. 14/73; 14/78
(58) Field of Classification Search .......... 14/73, 14/78
See application file for complete search history.

(56) References Cited

U.S. PATENT DOCUMENTS 7,069,614 B1 * 7/2006 Sivachenko et al. ........... 14/73

FOREIGN PATENT DOCUMENTS

| CH | 490 588 | 6/1970 |
|---|---|---|
| CH | 690 447 A1 | 9/2000 |
| DE | 198 25 087 | 12/1999 |
| EP | 0 193 182 | 9/1986 |
| EP | 0 573 757 | 12/1993 |
| GB | 2 107 247 | 4/1993 |
| GB | 2 337 022 | 11/1999 |
| GB | 2 355 957 | 5/2001 |
| HU | 211 353 B | 11/1995 |
| HU | 211 387 B | 11/1995 |
| HU | 198283 B | 11/1998 |
| HU | 219 471 B | 4/2001 |
| JP | 61029534 | 2/1986 |

(Continued)

OTHER PUBLICATIONS

Zingorenko, G.I., and Mamaeva, E.A.; "Industrialized Construction of Large Bridged,"; Moscow, Transport Publishing House, 1964, p. 162.

(Continued)

*Primary Examiner*—Raymond Addie
(74) *Attorney, Agent, or Firm*—Darby & Darby (57) ABSTRACT

Bridges decks or panels for bridge decks made of a metal-plastic-metal sandwich with the plastic bonded to the metal plates so as to transfer shear forces therebetween. The sandwich plates may be constructed with either a solid plastic core or a composite core consisting of plastic, metal plates or structural shapes and forms within or without a frame of girders. Sandwich plate bridge panels without peripheral metal frames are held together only by the adhesion of the plastic to the metal plates.

34 Claims, 7 Drawing Sheets

FOREIGN PATENT DOCUMENTS

| | | |
|---|---|---|
| JP | 5-272103 | 10/1993 |
| SU | 1123856 A | 11/1984 |
| SU | 1252440 A1 | 8/1986 |
| WO | 99/64234 | 12/1999 |
| WO | 00/59718 | 10/2000 |

OTHER PUBLICATIONS

International Seach Report of International Application PCT/GB01/03933, mailing date Nov. 26, 2001.

Hungarian Search Report of corresponding patent application P0303493, dated Sep. 30, 2005.

* cited by examiner

BRIDGE DECK PANELS, FABRICATION METHODS AND USE

CROSS REFERENCE TO PREVIOUS APPLICATION

This is a U.S. national phase application under 35 U.S.C. §371 of International Patent Application No. PCT/GB01/03933, filed Aug. 31, 2001, and claims the benefit of United Kingdom Patent Application No. 0024183.6, filed Oct. 3, 2000. The International Application was published in English on Apr. 11, 2002 as WO 02/29160 A1 under PCT Article 21(2).

The present invention relates to sandwich plate panels and bridge decks, particularly bridge decks for steel framed or supported bridges having decks formed of panels.

D-bridges are well-known temporary or permanent structures that consist of a framework of trusses and bridge panels. The D-bridge deck panels, conventionally made of steel, consist of a deck plate welded to a large number of longitudinally framed U-shaped stiffeners (commonly known as an orthotropic bridge deck; ie stiffened in one direction), two or more transverse beams, and longitudinal girders. The deck plates transfer load to the stiffeners and then to the transverse beams which directly transfer the loads into the trusses. A known design consists of 5 mm U-shaped stiffeners, welded to a 10 mm deck plate with two continuous 4 mm fillet welds. Wheel loads from vehicles crossing the bridge cause localized bending of the deck plate over the top of the stiffeners, which in turn leads to fatigue cracks of the welds that join the two. Fatigue cracks propagate along the bridge welds or into the deck plate reducing the deck panel's strength and stiffness, compromising its capacity to carry the design loads and reducing its service life. Deck panels with fatigue cracks (detected during routine inspections) are generally replaced.

To increase the fatigue resistance, researchers and those skilled in the art have traditionally thickened both the deck plate and stiffeners to reduce the stress range at the critical fatigue prone detail. In one known design, the deck plate and stiffeners are thickened to 12 mm and 6 mm respectively with the adjoining fillet weld sizes increased to 6 mm. The fatigue resistance was improved but was still insufficient as the basic construction details (fatigue prone weld configuration) remained unchanged. Further plate thickness increases will reduce the stress range and improve the fatigue resistance, but there is a practical limit: the deck panel weight exceeding the dead load carrying capacity of the supporting bridge structure.

Bailey bridges are temporary structures that consist of a framework of girders, trusses, bracing, and deck panels. Conventional Bailey bridge deck panels comprise a steel deck plate welded to longitudinally framed steel U-shaped sections with two channel sections at the edges. In an effort to minimize costs associated with fabrication and weight, the plates and sections are made as thin as possible, and intermittent welds are used to join the stiffening elements to the relatively thin deck plate. As before, these welds are susceptible to fatigue, the weld detail is fatigue prone and has a limited fatigue resistance which reduces the service life.

Accordingly it is an aim of the present invention to provide an improved bridge deck panel with equivalent strength and stiffness to existing bridge deck panels, but lighter, simpler in construction and/or less prone to fatigue.

According to the present invention, there is provided a bridge deck panel comprising a sandwich plate structure having upper and lower metal plates and an intermediate layer of a plastics or polymer material bonded to said metal plates so as to transfer shear forces therebetween.

A bridge deck panel according to the invention can be provided with the same geometry and peripheral supporting elements as an existing design so that it can replace panels in existing designs. The sandwich plate structure of the embodiment described below has increased strength and stiffness as compared to a metal plate of comparable total plate thickness.

To eliminate the fatigue prone details of the prior art it is envisaged that all steel bridge deck panels, the multiplicity of the stiffeners and associated welds are eliminated and replaced with a sandwich plate structure. In some embodiments one or more intermediate beams, shear plates, or embedded structural sections may be used to control deflections.

Eliminating the stiffeners reduces the required weld volumes, reduces the total exposed surface area requiring coating protection against corrosion, simplifies the structure, improves the fatigue resistance (increased service life for the same loads) and is less expensive to fabricate. In some embodiments, where minimizing weight is an important design criterion, the solid intermediate layer (core) may be replaced with a composite core consisting of solid ribs and some lower density form; as long as the bonded area between intermediate layer and the upper and lower metal plates is sufficient to transfer the shear forces therebetween. In this type of construction, the spacing and dimensions of the forms would be determined to prevent buckling of either metal plate.

Further details of sandwich plate structures suitable for use in the present invention can be found in U.S. Pat. No. 5,778,813 and British Patent Application GB-A-2 337 022. The intermediate layer may also be a composite core as described in British Patent Application No. 9926333.7.

The present invention will be described further below with reference to the following description of exemplary embodiments and the accompanying schematic drawings, in which.

In the various drawings, like parts are denoted by like reference numerals.

Figure 1:
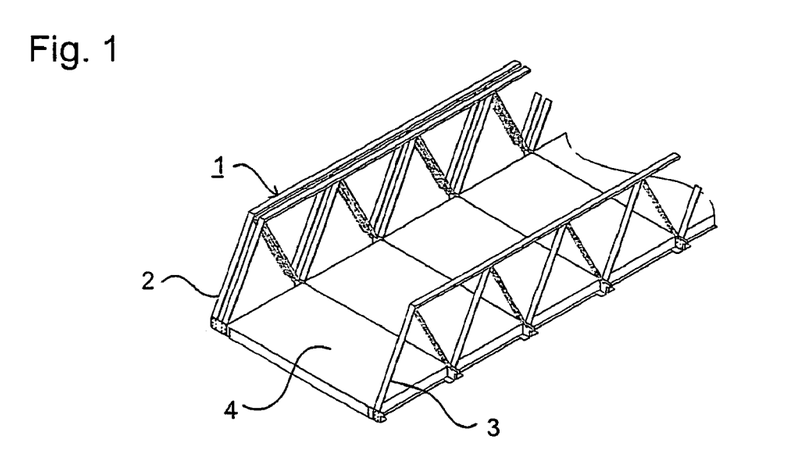
FIG. 1 is a perspective view of a "typical bridge" in which the deck panel of the present invention, spanning the full width of the bridge, may be used.

Embodiment 1: Prefabricated Sandwich Plate Bridge Deck Panel with Peripheral Frame FIG. 1 is a schematic diagram of a truss bridge which illustrates common types of construction. The supporting structure may consist of either a double truss 2 or single truss 3 which support main members which span the length of the bridge. Bridge deck panels 4 span between the main members. The bridge deck panels 4 may, for example, form a road surface for a single or multiple carriageway road. The bridge must therefore be capable of supporting dynamic loads from one or more vehicles, which may include lorries and other heavy goods vehicles. The frequency and magnitude of wheel loads and conditions for which the bridge deck panels must be designed will be dependent on the location of the bridge and the specific traffic loads for the carriageway.

Figure 2:
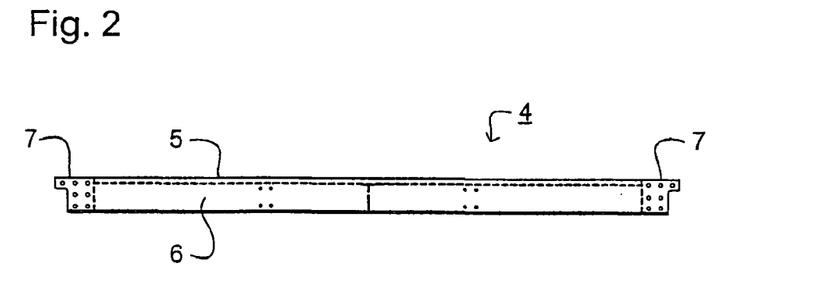
FIG. 2 is an end view of a bridge deck panel according to a first embodiment of the present invention illustrating connection details to the supporting bridge structure and those between panels.
Figure 3:
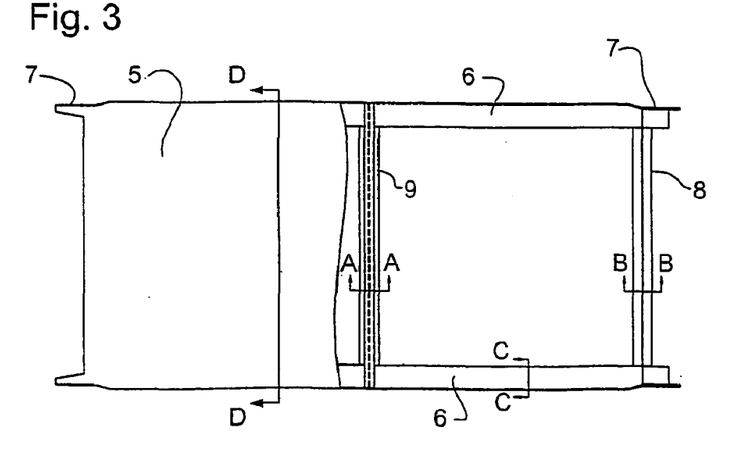
FIG. 3 is partly cut-away, plan view of the bridge deck panel of FIG. 2 with one intermediate beam.
Figure 4:
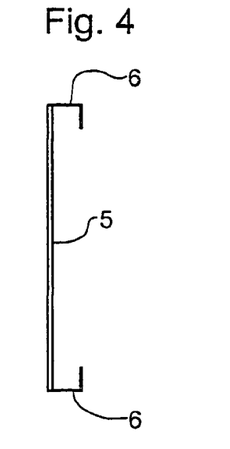
FIG. 4 is a cross-section of the bridge deck panel of FIG. 2 along line D—D.

A bridge deck panel 4 according to the present invention is shown in FIGS. 2 to 4 which are respectively an end view, a partially cut-away plan view and a cross-section. The bridge deck panel 4 comprises a sandwich deck plate 5 of generally rectangular cross-section fixed, along its long edges, to transverse girders 6 at the ends of which are provided connection plates 7 to enable the bridge deck panel 4 to be bolted to the trusses 2, 3 of the bridge 1. Additional longitudinal girders 8 are provided at the ends of the panels and an intermediate beam is provided along the midline of the panel 4. In use, vehicle loads are transmitted from the sandwich deck plate 5 to the transverse girders 6, with the assistance of the longitudinal girders 8 and intermediate beam(s) 9, and hence to the bridge trusses 2, 3.

Figure 5:
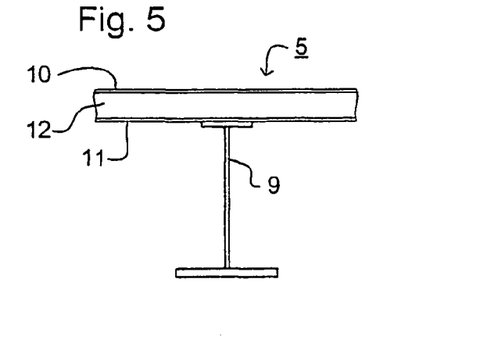
FIG. 5 is a cross-section of part of the bridge deck panel of FIG. 3 along the line A—A.
Figure 6:
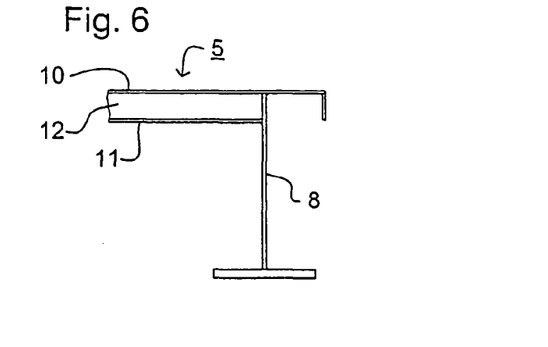
FIG. 6 is a cross-section of part of the bridge deck panel of FIG. 3 along the line B—B.
Figure 7:
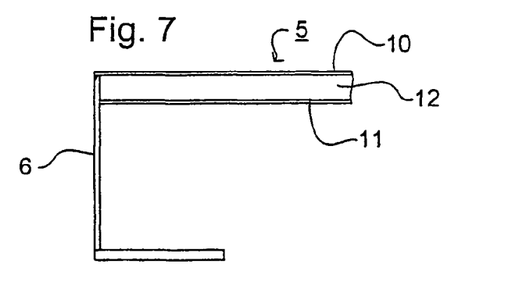
FIG. 7 is a cross-section of part of the bridge deck panel of FIG. 3 along the line C—C.

Details of the connection of the sandwich deck plate 5 to the peripheral frame and intermediate beam(s) 6, 8, 9 are shown in FIGS. 5, 6 and 7. For clarity, backing bars and specific weld details are not shown on these figures. These Figures also show that the sandwich deck plate 5 is formed from upper and lower steel plates 10, 11 which are bonded together by intermediate layer 12, which comprises a plastics or polymer material, preferably elastomer, with sufficient strength to transmit shear forces between the metal plates.

FIG. 5, a cross-section along the line A—A in FIG. 3, illustrates a typical connection between the sandwich deck plate 5 and on intermediate beam 9 where the web of a monosymmetric I-shaped section is welded to the lower metal plate 11 of the sandwich deck plate 5. Alternatively, the internal beam may be an inverted T-section with the web welded directly to the lower metal plate 11.

FIG. 6, a cross-section along the line B—B of FIG. 3, illustrates a typical connection between the longitudinal end girder 8 and sandwich deck plate 5, where the sandwich deck plate 5 frames into and is welded to the web of the girder. In some embodiments the upper metal plate 10 may be aligned with the web or, as in FIG. 6, cold formed and extended beyond the web forming a stiffened edge plate.

FIG. 7, a cross-section along line C—C of FIG. 3, illustrates a typical connection between the sandwich deck plate 5 and a transverse girder 6, where the sandwich deck plate 5 frames into and is welded to the web of the girder. The offset flange provides a flush edge between adjacent panels so that adjacent panels can be bolted together providing a shear connection between them. The peripheral metal frame 6, 8 and upper 10 and lower metal plates 11 form an air tight enclosed cavity into which the intermediator layer 12 is injected.

Figure 8:
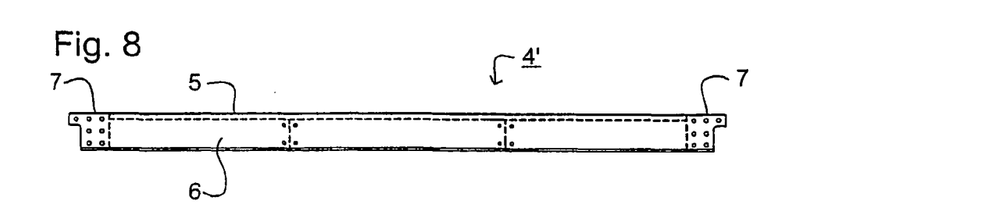
FIG. 8 is a side view of a bridge deck panel according to a variant of the first embodiment with two intermediate beams.
Figure 9:
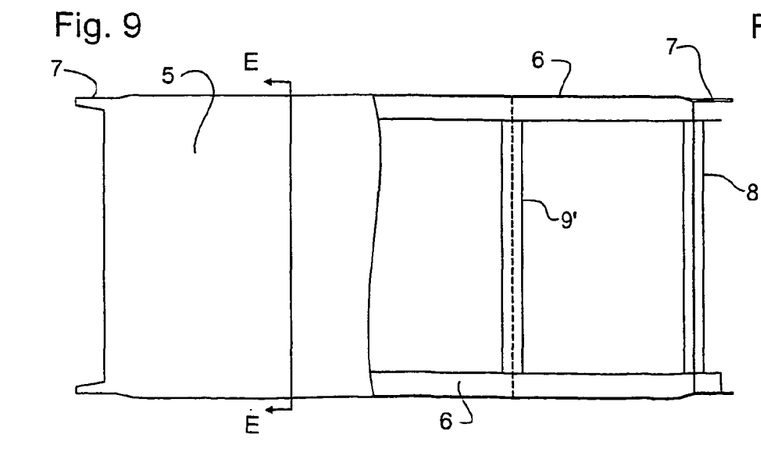
FIG. 9 is partly cut-away, plan view of the bridge deck panel of FIG. 8.
Figure 10:
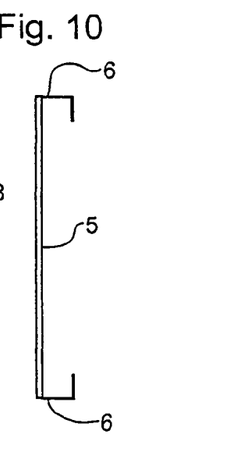
FIG. 10 is a cross-section of the bridge deck panel of FIG. 9 along line E—E.

A variation of the this prefabricated bridge deck panel 4' according to the first embodiment is illustrated in FIGS. 8 to 10. It has two intermediate beams 9', aligned with bolted shear connections between adjacent panels to provide a direct load path for load sharing between panels as vehicles move along the length of the bridge 1. All other details for the bridge deck panel 4 are the same.

Figure 11:
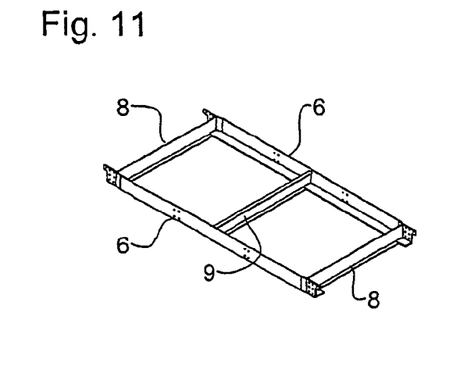
FIGS. 11 to 14 illustrate steps in the fabrication of a bridge deck panel according to the first embodiment.
Figure 12:
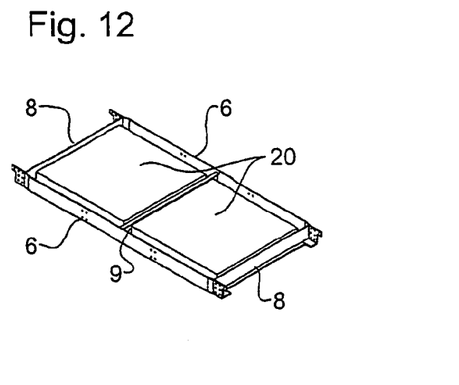
Figure 13:
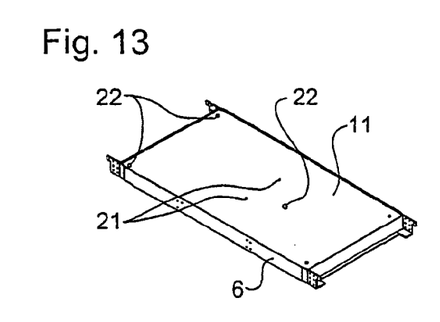
Figure 14:
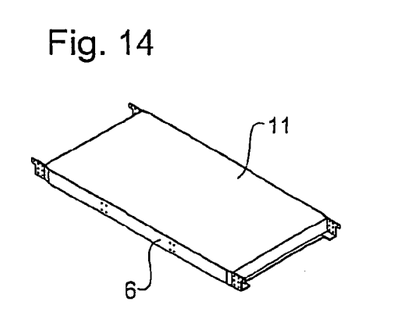

The fabrication process for the panels of the first embodiment is greatly simplified as compared to a prior art structure because the positioning and welding of all longitudinally framed U-shaped stiffeners are eliminated. According to the invention, the supporting steel frame, consisting of longitudinal and transverse girders 6, 8, intermediate beams 9 and connection plates 7, is fabricated in a conventional manner, resulting in the structure shown in FIG. 11. The supporting steel frame is then centred around two block shaped reusable forms 20, e.g. permanently located on the shop floor, as shown in FIG. 12. The forms as shown in FIG. 13 are used to temporarily locate and support the bottom faceplate 11 while it is fillet welded to the peripheral metal frame eliminating the need for backing bars. Metal or plastic spacers 21, placed as necessary to support the upper plate 10, ensure the correct through thickness of the intermediate layer 12. Prior to further welding (closing of the cavity) the interior surfaces are degreased and wiped dean with MEK solvent or equivalent. The upper metal plate 11 is then placed on top of the frame, as shown in FIG. 14, and is welded all-around with a partial penetration groove weld. If required, an additional fillet weld can be provided to further join the lower metal plate 10 to the underside of the support structure. One injection port 22 and one or more vent holes 23 can be made in either the lower plate 10, the upper plate 11 or in the peripheral frame 6, 8. The port and holes are located to accommodate injection equipment, to minimize the effect on structural performance and to facilitate fabrication. Subsequently, elastomer is then injected into the cavity in approximately 160 s. Finally, the injection port 22 and venting holes 23 are sealed with metal plugs. The prefabricated bridge deck panel according to the invention can be moved within 10–15 minutes from the time of injection.

Embodiment 2: Prefabricated Light Weight Sandwich Plate Bridge Deck Panels

A military light weight sandwich plate bridge deck panel 100, according the a second embodiment of the invention is illustrated in FIGS. 15 to 22, was designed for military load class MLC12. The overall bridge length L, panel length 1, minimum width W of the deck, and maximum weight of the bridge (including the super-structure) for this particular example are 20 m, 2000 mm, 2800 mm, and 6 to 8 tons, respectively.

Figure 15:
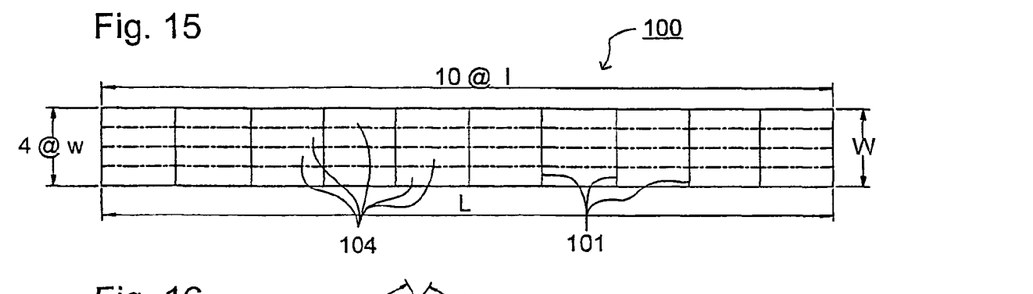
FIG. 15 is a plan view of a bridge deck incorporating panels according to a second embodiment of the invention spanning between transverse girders or beams.

A typical bridge deck 100 is made up of 40 identical bridge deck panels 104 spanning between transverse girders 101, as illustrated in the plan view in FIG. 15 (for clarity, the bridge super structure is not shown). Each panel must be sufficiently light to be carried and installed by two men and should have a maximum weight of approximately 100 kg. The panel can be lifted using a simple lifting frame (not shown) with handles that can be attached to each panel through the shear clips, existing bolt holes or through additional holes (not shown) designated for this purpose. Universal dimensions and details (common thicknesses, width, bolt hole locations, shear clip details) allow the bridge deck panels to be placed anywhere along the bridge deck. As a result each bridge deck panel must be designed for all probable locations of the panel of both tank tread and truck wheel loads associated with MLC12 loading.

Figure 16:
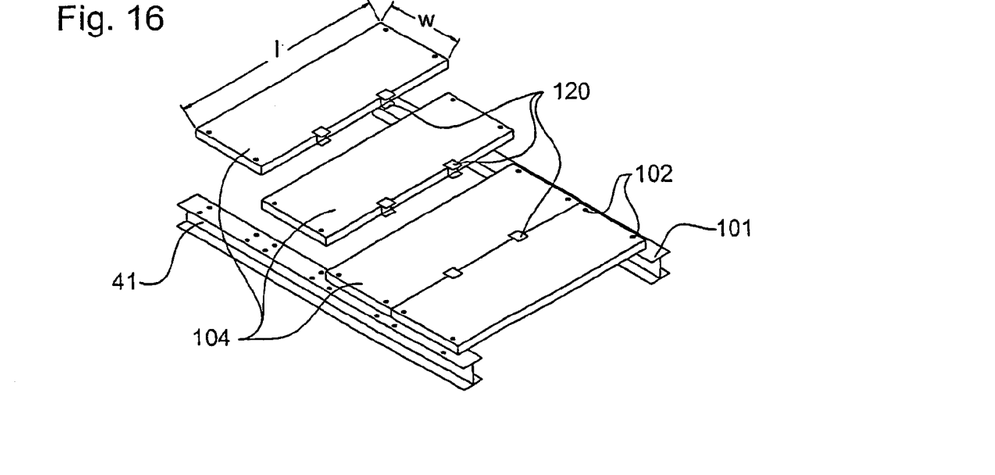
FIG. 16 is a perspective view of a part of the bridge deck of FIG. 15 showing the placement of bridge deck panels according to the second embodiment illustrating connection details to supporting bridge members and shear connections between panels.
Figures 17, 18, 19:
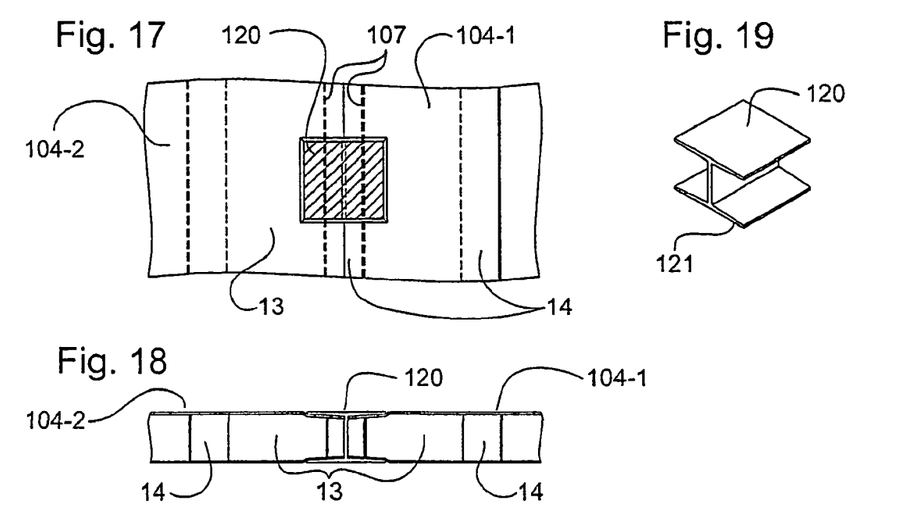
FIGS. 17 and 18 are respectively plan and cross-sectional views of an arrangement for joining bridge deck panels (providing shear connection) according to the second embodiment.
FIG. 19 is a perspective view of a clip used for joining bridge deck panels according to the second embodiment.

FIG. 16 illustrates the connection of the panels to the transverse girders and the shear interconnection between panels in greater detail. Two tapered H-shaped shear clips 120, made of plastic or metal, connect adjacent panels 104 to maintain consistent deflections between panels if vehicles migrate across the width of the bridge deck. The shear clips 120 are snug fit and flush with both surfaces. The shear clip 120 and its manner of use are shown in FIGS. 17 to 19. The tapered flange of the shear clip 120 allows for easy placement and removal. The flange 121 length is sufficient to engage the edge metal shear plates 107. Two bolts 102 at either end bolt the panels 104 to the transverse girders 101.

Figure 20:
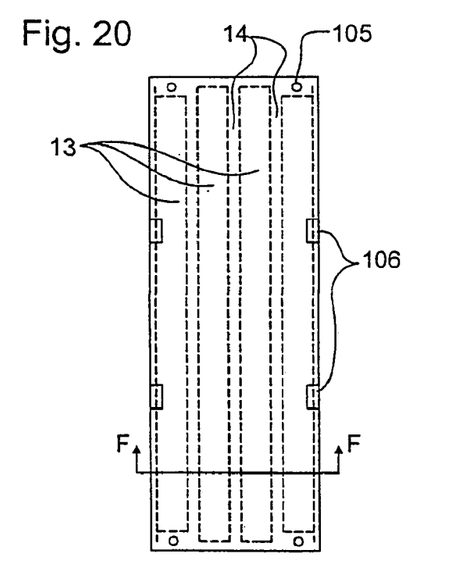
FIG. 20 is a plan view of a bridge deck panel according to the second embodiment showing hidden detail (locations of forms and shear plates)
Figure 21:
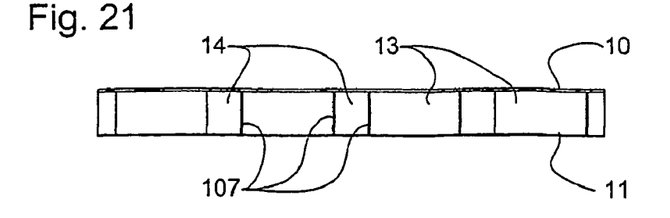
FIG. 21 is an enlarged cross-section of a bridge deck panel according to the second embodiment of the invention along line F—F.
Figure 22:
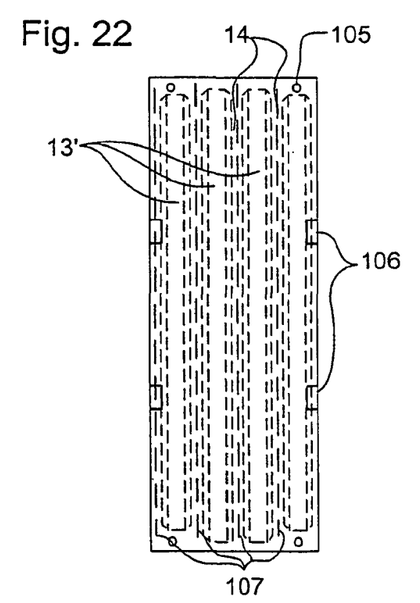
FIG. 22 is a plan view of a bridge deck panel according to the second embodiment showing variations in the shape of the forms to facilitate flow of the injected material.
Figure 23:
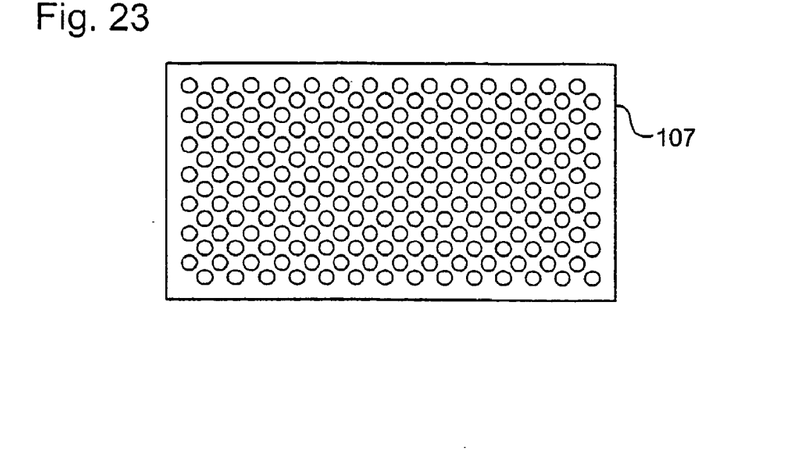
FIG. 23 illustrates a perforated shear plate.

FIGS. 20 and 22 show a lightweight intermediate layer 12 (composite core which may be used with any embodiment) consisting of low density forms 14, plastics or polymer ribbed sections 13, internal steel shear plates 107, bolting details 105 and shear clip embossments 106. The plastics or polymer rib geometry may vary from a rectangular cross section to one that looks like an Ionic column, to increase the bonded surface to the upper and lower metal plates 11, 10; and maximize the cost effectiveness of the construction. The top and bottom plate 10, 11 thicknesses for this particular example can be different, e.g. 3 mm and 2 mm respectively, to allow the top plate 10 extra wearing surface. The panels of the second embodiment are constructed entirely without welds. FIG. 22 illustrates a variation in the geometry of low density forms, provision of chamfered corners to facilitate the flow of injected plastics or polymer material. The exact dimensions of the components of the intermediate layer are sized to provide adequate bond strength, stiffness, overall strength for the specified loads. The shear plates 107 for this embodiment may be solid or perforated with punched holes as illustrated in FIG. 23, to allow free flow of the injected plastics or polymer material and after curing to increase the load (mechanical interlock) between the plates and plastic ribs. Perforated plates provide stiffer plates, reduced slenderness and reduced weight of component.

Figure 24:
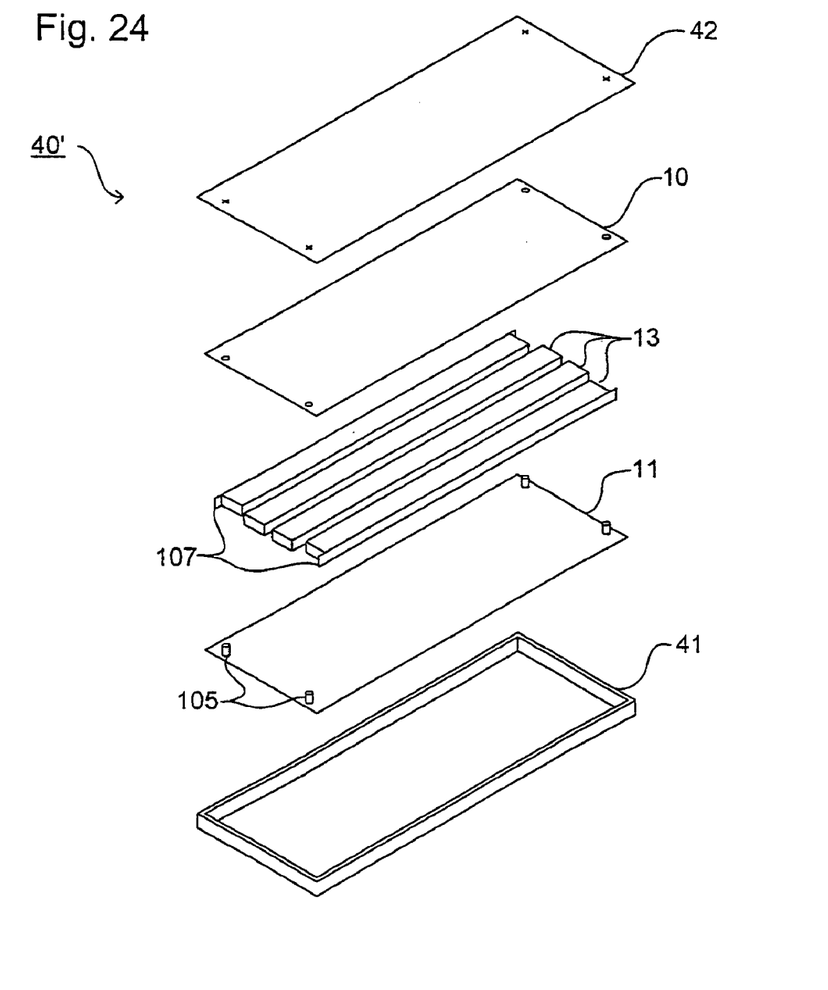
FIG. 24 is an schematic of a mould and parts used for fabricating bridge deck panels according to the second embodiment.
Figure 25:
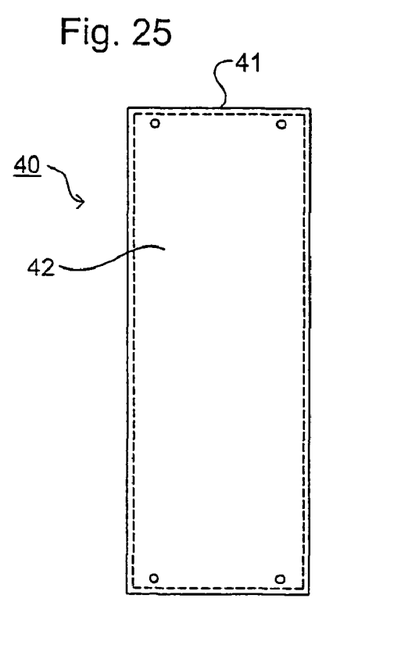
FIGS. 25 and 26 are respectively plan and end views of the mould of FIG. 24.
Figure 26:
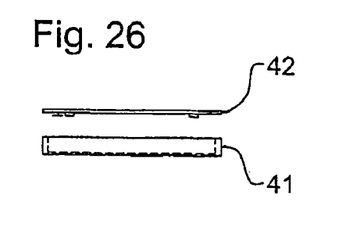

The bridge deck panels according to the second embodiment are prefabricated in a mould 40, shown in FIGS. 24 to 26, that ensures dimensional accuracy and quality construction. Dimensional accuracy is important for quick fit-up in the field and for providing consistent weight without significant variations from panel to panel. The thin lower and upper metal plates 10, 11 with embossments for the shear clips, interior shear plates 107 and forms 13 are placed into a closed mould 41, 42 as illustrated schematically in FIG. 24. Plastic is injected to fill the cavity in approximately 12 to 15 seconds. The finished deck panel can be removed within a few hours. Corrosion or slip resistant coatings are then applied to the exposed metal surfaces.

Variations of this embodiment are a function of the design parameters and conditions for the given bridge deck panel. One typical variation is illustrated by the design shown in FIGS. 27 to 34, for a bridge deck panel that spans approximately 3000 mm between transverse girders and has a design truck load of 16T over a tyre footprint of 200 mm×500 mm.

Figure 28:
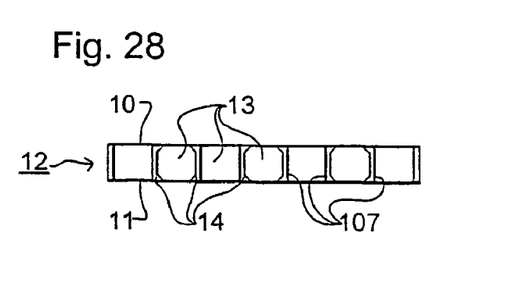
FIG. 28 is a cross-section along line G—G of the bridge deck panel according to the second embodiment.

The 1050 mm wide bridge deck panel 204 comprises upper and lower metal plates 10, 11 and an intermediate layer (core) 12. The core 12 is constructed of regularly spaced longitudinal elastomer ribs 14 and foam inserts that separate the top and bottom plates. Internal shear plates (with holes) 107, as shown in FIG. 28, are bonded to the elastomer ribs 14. Shear is transferred to the steel plates 107 via the bond (adhesion and mechanical) to provide the required flexural stiffness.

Figure 27:
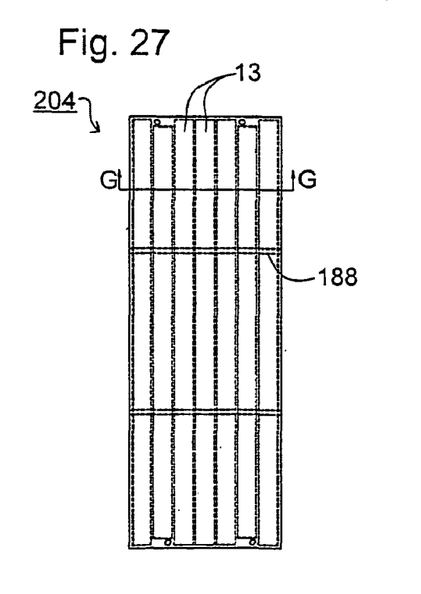
FIG. 27 is a plan view, showing hidden detail, of a bridge panel according to the second embodiment.
Figure 29:
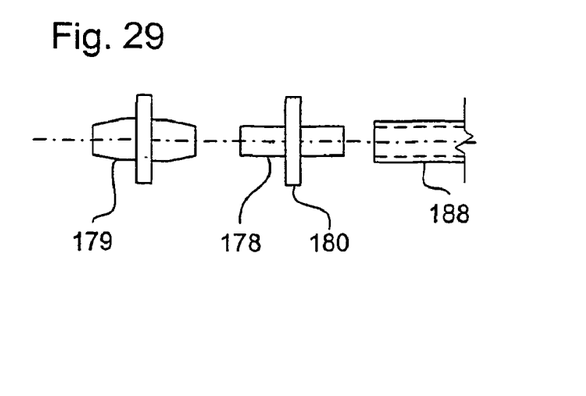
FIG. 29 illustrates typical male fitting shear connectors of a bridge panel useable with the second embodiment.
Figure 30:
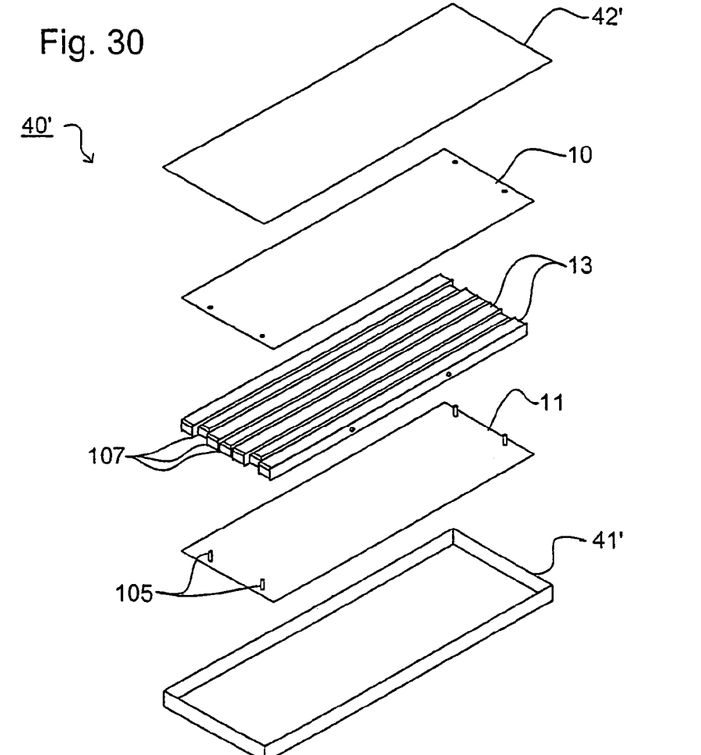
FIG. 30 is a schematic of a mould and parts used for fabricating bridge deck panels according to the second embodiment.
Figure 31:
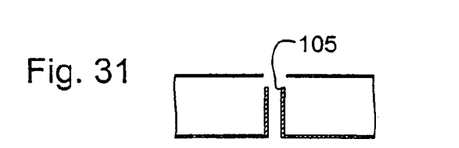
FIGS. 31 to 34 illustrate steps in the fabrication of the bolted connections in the second embodiment.
Figure 32:
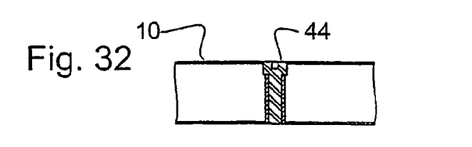
Figure 33:
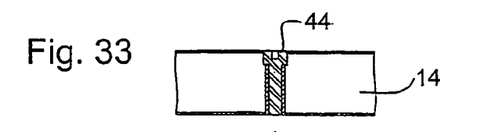

FIGS. 27 and 29 show a variation in the shear connection details between panels. Metal or plastic tubes 188 are embedded in the intermediate layer 12 across the short dimension of the panel. Male shear connectors, with either straight 178 or tapered 179 ends and a flange 180, illustrated in FIG. 29 are fitted into the tubes of adjacent panels to provide the required shear connection. These connectors may be constructed of metal or plastic. All other details are similar in function and only vary in dimensions and location and are application or design dependent.

Fabrication of a deck panel according to this embodiment occurs in two stages. First, the foam 13 is cast integrally with the longitudinal steel plates 107 in an injection mould. This initial "positive" form is then placed in the elastomer injection mould 40' illustrated in FIG. 30 along with the top and bottom steel plates 10, 11. The elastomer is injected into the mould bonding all the components including bolting and shear connection details into a structural panel that requires no welding.

Figure 34:
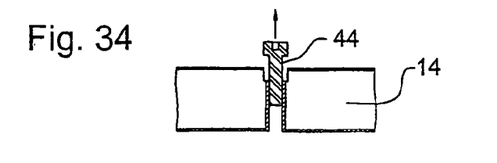

FIGS. 31 to 34 show the fabrication detail for the section of a connection sleeve for bolting the deck sections to the transverse girders. The steps of this process are:
1. Press fit metal sleeves 105 into bottom plate 11 and position assembly in mould with rigid foam and interior steel plates (FIG. 31).
2. Position plugs 44 (with release agent) into sleeves 105. Position top plate 10 and close mould (FIG. 32).
3. Inject elastomer 14 (FIG. 33).
4. Remove bridge deck panel and extract plugs 44 (FIG. 34).

The benefits associated with prefabricated sandwich plate bridge deck panels (mass production, robotic assembly, uniform and high quality construction, dimensional accuracy), elimination of all welding, and the elimination of all fatigue prone details which restrict service life are equally applicable to each design regardless of minor variations in geometry or construction details.

Figure 35:
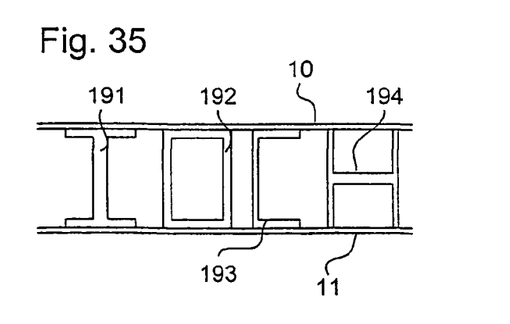
FIG. 35 is a cross-section of a bridge deck panel according to the second embodiment, illustrating the embodiment of a variety of structural sections (shapes) within the intermediate layer to provide shear stiffness and control deflections.
Figure 36:
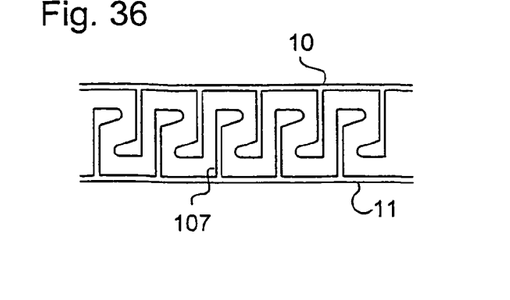
FIG. 36 illustrates a configuration of extruded upper and lower plates useable in the invention.

The benefits associated with the composite core are equally applicable to the first embodiment. Other variations of the composite core include incorporating shaped sections like channels, angles, I-shaped sections and rectangular or circular hollow structural sections as internal shear plates 107. Steel plates 107 may be in fact be metal members of any desired shape such as I beams. FIG. 35 illustrates various structural sections 191, 192, 193, 194 within the intermediate layer. It may also be possible to use exruded aluminium sections as the upper and lower plates in which the shear plates 107 are part of the extruded shape that may interlock one with the other as illustrated in FIG. 36.

Other variations may include bridge deck panels that are constructed with solid cores and that are not rectangular in plan. For example a skewed bridge may use bridge deck panels in the shape of parallelograms and curved bridges, panels with curved edge girders and radially located transverse girders.

Embodiment 3: Prefabricated Bridge Deck Panels Integrated into a Permanent Structure Providing a Continuous Deck In a third embodiment of the present invention, the step of final injection of the plastics or polymer material into the weld margin cavity of a prefabricated bridge deck panel or into a cavity between upper and lower plates of a bridge deck panel is carried out in situ once the upper and lower plates have been attached to the bridge. The panels are similar to those of the second embodiment except that they are provided with upper and lower flanges which are welded to the bridge superstructure forming the weld margin cavities.

This method of construction provides a continuous structural bridge deck. Prefabricated bridge deck panels are structurally stiff, easier to handle and provide all the benefits of prefabricated construction to in situ built bridge structures. The intermediate layer 12 of the bridge deck panels for the third embodiment of the present invention can either be made of solid plastic or of a composite construction as previously described. A further advantage of this type of construction is that the sandwich bridge deck panel acts as an effective compression flange for the supporting girders and beams.

In this embodiment either the prefabricated bridge deck panel or the upper and lower plates must be welded to the bridge superstructure to form air tight cavities prior to injection Construction methods used to construct the 'inject in place' bridge decks may be similar to those for cast in place concrete. Typically, a continuous deck is constructed sequentially with the bridge deck panels being welded in place, injected and then when cured serving as a working platform for the erection of the next panel along the length of the bridge. In such cases, the bridge deck panels must be designed for the anticipated construction loads as well as the normal operating environment, self weight and traffic loads.

Alternatively, if the bridge is launched, then the deck structure will be constructed sequentially (welding and injecting newly attached bridge deck panels) as the bridge is pushed out over the abutments.

Techniques described elsewhere in connection with joining together the metal sections of bridge deck panels according to the present invention are equally applicable to the third embodiment.

Materials and General Structural Properties.

The upper and lower metal plates 10, 11, and other metal parts of the deck panels described above for use with any embodiment, are preferably structural steel, as mentioned above, though may also be aluminium, stainless steel or other structural alloys in applications where lightness, corrosion resistance or other specific properties are essential. The metal should preferably have a minimum yield strength of 240 MPa and an elongation of at least 10%. The upper plates, lower plates and shear plates may be solid or perforated, may be plated or have any other surface preparation applied or may be comprised of different materials and have thicknesses varying from 0.5 mm to 25 mm. Desired surface treatments, e.g. for corrosion prevention or slip resistance, or decoration, etc., may be applied to one or both of the outer surfaces of the deck panels.

The intermediate layer should have a modulus of elasticity, E, of at least 250 MPa, preferably 275 MPa, at the maximum expected temperature in the environment in which the member is to be used which could be as high as 100° C. The intermediate layer should be between 5 and 1000 mm thick.

The ductility of the material of the intermediate layer at the lowest operating temperature must be greater than that of the metal layers, which is about 20%. A preferred value for the ductility at lowest operating temperature is 50%. The thermal coefficient of the material of the intermediate layer must also be sufficiently close to that of the steel so that temperature variation across the expected operating range, and during welding, does not cause delamination. The extent by which the thermal coefficients of the two materials can differ will depend in part on the elasticity of the intermediate layer but it is believed that the thermal expansion coefficient of the intermediate layer may be about 10 times that of the metal layers. The coefficient of thermal expansion may be controlled by the addition of fillers. If exposed to the elements (weather) then the plastics or polymer should be formulated to be hydrolytically stable and resistant to ultraviolet degradation.

The preferred material is a polyurethane elastomer which comprises of a polyol (e.g. polyester or polyether) together with an isocyanate or a di-isocyanate, a chain extender and a filler. The filler is provided, as necessary, to reduce the thermal coefficient of the intermediate layer, reduce its cost and otherwise control the physical properties of the elastomer. Further additives, e.g. to alter mechanical properties or other characteristics (e.g. adhesion and water or oil resistance), and fire retardants may also be included.

Low density forms for the composite core of embodiment 2 may be constructed of foam, wood or hollow light gauge metal sections. The preferred form is a polypropylene semi-rigid foam with a density greater than 20 kg/m$^3$.

The bond strength between the elastomer and metal layers must be at least 0.5, preferably 6, MPa over the entire operating range. This is preferably achieved by the inherent adhesiveness of the elastomer to metal but additional bond agents may be provided.

Whilst an embodiment of the invention has been described above, it should be appreciated that this is illustrative and not intended to be limitative of the scope of the invention, as defined in the appended claims, In particular, the dimensions given are intended as guides and not to be prescriptive.

The invention claimed is:

1. A bridge deck panel comprising:
   a sandwich structure having upper and lower metal plates and an intermediate layer of a compact plastics or polymer materials bonded to said metal plates so as to transfer shear forces there between; and
   a metal frame mounted to the periphery of said deck panel, the web of said frame forming side walls around said intermediate layer.

2. A bridge deck panel according to claim 1 further comprising at least one intermediate beam extending between and joined to said metal frame, the web of said intermediate beam forming a side wall of a space filled by said intermediate layer.

3. A bridge deck panel according to claim 2 wherein said at least one intermediate beam is also attached to at least one of said upper and lower metal plates.

4. A bridge deck panel according to claims 1, 2 or 3 wherein said upper metal plate has a thickness in the range of from 0.5 to 25 mm, said lower metal plate has a thickness in the range of from 0.5 to 25 mm and said intermediate layer has a thickness in the range of from 5 to 1000 mm.

5. A bridge deck panel according to any one of claims 1, 2 or 3 wherein said upper and lower metal plates are comprised of different metals and/or are of different thickness and/or have different surface treatments applied.

6. A bridge deck panel according to any one of preceding claims 1, 2 or 3 wherein said intermediate layer is formed of compact elastomer.

7. A bridge deck panel according to claim 1 wherein said intermediate layer comprises an insert and said plastics or polymer material occupies the space between said upper and lower metal plates not occupied by said insert.

8. A bridge deck panel according to claim 7 wherein said insert comprises foam and said plastics or polymer material is compact elastomer.

9. A bridge deck panel according to claim 7 or 8 wherein said insert comprises a plurality of elongate elements arranged generally parallel to at least one side edge of said deck panel.

10. A bridge deck panel according to claim 9 wherein said elongate elements span between said upper and lower metal plates and extend for substantially all the length of said deck panel so that said plastics or polymer material forms a plurality of spaced-apart elongate ribs.

11. A bridge deck panel according to claim 10 further comprising at least one shear plate bonded to one of said elongate ribs.

12. A bridge deck panel according to claim 11 wherein in said at least one shear plate has through holes.

13. A bridge deck panel according to claim 10 further comprising at least one metal member bonded to one of said elongate ribs to prevent shear between the upper and lower plates.

14. A bridge deck panel according to any one of claims 7 or 8 wherein said upper and lower metal plates are held together substantially only by adhesion to said intermediate layer.

15. A bridge deck panel according to any one of claims 7 or 8 having no structural weld joining said upper and lower metal plates.

16. A bridge deck panel or two bridge deck panel according to any one of claims 1, 2, 3, 7 or 8 wherein said plastics or polymer material has a modulus of elasticity, E, greater than or equal to about 250 MPa and a ductility exceeding that of the metal layers.

17. A bridge deck panel according to any one of claims 1, 2, 3, 7 or 8 wherein said plastics or polymer has a modulus of elasticity greater than or equal to about 275 MPa.

18. A bridge deck panel according to any one of claims 7 or 8 having at least one recess in at least one said plates in at least one side edge for receiving a clip to join adjacent like panels and transfer shear forces there between.

19. Two bridge deck panels according to claim 18 and an H-shaped clip engaging said recesses to join said deck panels together.

20. Two bridge deck panels each according to claim 6 having at least one transverse tube embedded in said plastic material for receiving a male metal shear connector to join adjacent like panels and transfer shear forces there between.

21. A bridge deck panel according to claim 6 having a peripheral frame with bolt holes for receiving bolts to join like panels and transfer shear forces there between.

22. A bridge deck panel according to claim 6 having metal tubular sleeves through the thickness for receiving bolts to join said panels to said bridge framing members.

23. A bridge having at least one bridge deck panel according to any one of claims 1, 2 or 3.

24. A method of manufacturing a panel, the method comprising the steps of:
   fabricating a metal frame;
   placing said frame around a projecting block;
   placing a first metal plate on said projecting block within said frame;
   welding said first plate to said frame;
   placing a second metal plate on said frame to form a cavity with said first plate;
   welding said second plate to said frame; and
   injecting uncured plastics or polymer material into said cavity.

25. A method according to claim 24 wherein injection ports and vent holes for said step of injecting are provided in either said first plate, said second plate or said metal frame.

26. A method according to claim 24, or 25 wherein said metal frame includes at least one intermediate beam and in said step of placing said frame around a projecting block, said frame is placed around at least two projecting blocks such that said intermediate beams lie between adjacent projecting blocks.

27. A method of manufacturing a panel, the method comprising the steps of:
   assembling in a mould upper and lower metal plates, and a form, said form being positioned between said upper and lower metal plates in said mould and leaving voids;
   closing said mould; and
   injecting uncured plastics or polymer material into said mould to fill said voids between said upper and lower plates, said plastic material, when cured, bonding to said upper and lower plates so as to transfer shear forces there between.

28. A method according to claim 27 wherein at least one metal tube or at least one sleeve is additionally positioned between said upper and lower metal plates before said closing said mould step.

29. A method according to claim 27 or 28 wherein said form comprises a plurality of elongate elements and in said step of assembling, said elongate elements are placed in said mould generally parallel and spaced apart so that said plastic material, when injected, forms a plurality of spaced-apart ribs.

30. A method according claim 27 wherein in said step of assembling, at least one shear plate is placed in said mould adjacent at least one elongate element so that said plastics or polymer material bonds to said shear plate as well as to said upper and lower metal plates.

31. A method according to claim 30 comprising the further step, before said step of assembling, of injection moulding at least one of said plurality of elongate elements integrally with the or a shear plate.

32. A panel manufactured according to the method of any one of claims 24, 25, 27, 28, 30, or 31.

33. A bridge comprising a deck and a support structure, said deck comprising upper and lower plates fixed to said support structure, said support structure providing peripheral side walls and defining a cavity therewith, said cavity being at least partially filled with a plastics or polymer material bonded to said metal plates so as to transfer shear forces there between.

34. A method of constructing a bridge having a support structure, the method comprising the steps of:
    fixing upper and lower plates to said support structure, said support structure providing peripheral side walls, to define a cavity therewith and to provide a deck for said bridge; and
    injecting uncured plastics or polymer material into said cavity.

* * * * *